United States Patent [19]

Gras et al.

[11] 4,246,380
[45] Jan. 20, 1981

[54] POWDERY POLYURETHANE LACQUERS BASED ON POLYESTER RESINS AND BLOCKED ISOCYANATES

[75] Inventors: Rainer Gras, Herne; Felix Schmitt, Herten; Elmar Wolf, Herne, all of Fed. Rep. of Germany

[73] Assignee: Chemische Werke Huls AG, Marl, Fed. Rep. of Germany

[21] Appl. No.: 929,561

[22] Filed: Jul. 31, 1978

[30] Foreign Application Priority Data

Aug. 6, 1977 [DE] Fed. Rep. of Germany ....... 2735497

[51] Int. Cl.³ .................. C08G 18/80; C08G 18/42
[52] U.S. Cl. .................. 525/440; 427/185; 427/195; 525/131; 525/374; 525/528; 528/45; 528/902; 428/402
[58] Field of Search ............. 528/45; 260/859 R; 525/440

[56] References Cited

U.S. PATENT DOCUMENTS

| | | | |
|---|---|---|---|
| 3,819,586 | 6/1974 | Rudolph et al. | 528/45 |
| 3,893,977 | 7/1975 | Wingler | 528/45 |
| 3,922,253 | 11/1975 | Jerabek et al. | 528/45 |
| 3,931,117 | 1/1976 | Leonard | 528/45 |
| 3,993,849 | 11/1976 | Victorius | 528/45 |
| 3,998,768 | 12/1976 | Pettit | 528/45 |
| 4,018,744 | 4/1977 | Wolgemuth | 528/45 |
| 4,028,309 | 6/1977 | Fang | 528/45 |
| 4,150,211 | 4/1979 | Müller et al. | 528/45 |

Primary Examiner—H. S. Cockeram
Attorney, Agent, or Firm—Oblon, Fisher, Spivak, McClelland & Maier

[57] ABSTRACT

A powdery polyurethane lacquer which comprises (a) a hydroxyl-group containing polyester resin with an OH number of 40–240 and (b) an ε-caprolactam-blocked polyisocyanate, selected from the group consisting of triisocyanatoisocyanurate of 3-isocyanatomethyl-3,5,5-trimethylcyclohexylisocyanate and mixtures of said triisocyanatoisocyanurate with monomeric or oligomeric 3-isocyanatomethyl-3,5,5-trimethyl-cyclohexylisocyanate; wherein the ε-caprolactam-blocked triisocyanatoisocyanurate has at least two blocked isocyanate groups and wherein the ε-caprolactam-polyisocyanate is present in an amount sufficient to cause hardening of said mixture of (a) and (b). The lacquer is especially useful for electrostatic coating of substrates.

10 Claims, No Drawings

POWDERY POLYURETHANE LACQUERS BASED ON POLYESTER RESINS AND BLOCKED ISOCYANATES

BACKGROUND OF THE INVENTION

1. Field of the Invention

The present invention relates to a powdery polyurethane lacquer useful for the coating of substrates by electrostatic application.

2. Description of the Prior Art

It is already known to use powdery lacquers made of hydroxy group-containing polyesters, polyacrylates and epoxide resins with polyisocyanates with blocked isocyanate groups in the lacquer sector, for the coating of a substrate by electrostatic application by spraying or drizzling, followed by hardening.

As a blocking agent for the isocyanate groups it has been found, after some experiences with phenol (which has been unsatisfactory with regard to odor problems and bubble formation) to use especially $\epsilon$-caprolactam (DT-OS 19 57 483).

As polyisocyanate, it has been known to use, because of a series of advantages, especially 3-isocyanatomethyl-3,5,5-trimethylcyclohexylioscyanate, named as IPDI hereinafter (DT-AS 21 05 777).

Polyurethane-powdery lacquers on the basis of $\epsilon$-caprolactam-blocked IPDI are characterized, with respect to polyurethane powdery lacquers made on the basis of other polyisocyanates by especially good weather stability, flow properties and thermostability. They have the disadvantage however-compared for example with epoxide resin powders- that the hardening conditions, that is the hardening temperature and hardening time, are relatively high.

Many attempts to decrease these disadvantages as for example by addition of catalysts which can reduce the hardening times, have been made. However, because of technological disadvantages, it has been impossible to carry out these proposals.

Compared with the epoxide resin powder lacquers, and also with others, the weight relation between resin (polyester) to hardener is, in polyurethanes, clearly on the side of the hardener. This fact burdens not only the commercialization of powder lacquers based on this resin group, but also requires a special standardization on the part of the production plants due to this circumstance.

These disadvantages can be dealt with by two means. In the case where it is necessary for this resin group to have a stoichiometric relation of resin/hardener for the standardization of the optimum group of properties, it is possible theoretically to push the relation between resin/hardener in favor of the resin in such a way that one tries to increase the content of the cross-linked isocyanate groups and/or to reduce the content of the OH-groups on the resin side. If one follows the first option, then one finds out that, based on the presently used isocyanate-urethane hardeners, an increase in the NCO-concentration in the hardener influences in a strong negative way the strong stability of the finished powder lacquer. The reduction in the OH-count of the polyol component of the polyester leads usually to a decrease in the functionality of the polyol component. Because of it, the chemical stability of such a lacquer is very weak, and it has to be made up desirably by increasing the functionality of the hardener.

SUMMARY OF THE INVENTION

It has now been surprisingly found that powder lacquers based on hydroxy group-containing macromolecular compositions, such as polyesters, polyacrylates and epoxide resins, and $\epsilon$-caprolactam-blocked polyisocyanates, do not possess the above mentioned disadvantages or possess them only in a very weakened form, when one uses as the polyisocyanate the triisocyanatoisocyanurate of 3-isocyanatomethyl-3,5,5-trimethylcyclohexylisocyanate and if necessary also uses oligomers together with monomeric 3-isocyanatomethyl-3,5,5-trimethylcyclohexylisocyanate.

DESCRIPTION OF THE PREFERRED EMBODIMENTS

An object of this invention is therefore to provide powdery polyurethane lacquers from hydroxy group-containing polyesters, polyacrylates or epoxy resins and $\epsilon$-caprolactam-blocked polyisocyanates as hardening component, wherein, said polyisocyanate component is the triisocyanatoisocyanurate of of 3-isocyanatomethyl-3,5,5-trimethylcyclohexylisocyanate and if necessary oligomers together with monomeric 3-isocyanatomethyl-3,5,5-trimethylcyclohexylisocyanate.

This aliphatic triisocyanatoisocyanurate can be prepared according to the procedures of DT-OS No. 23 25 826. Another useful trimerization catalyst is also described in DT-OS 26 44 684. The trimerization can be carried out neat or in an inert solvent. In order to carry out the trimerization procedure it is useful to stop the reaction at a determined NCO-content in the mixture, and preferably when 30–60% of the NCO groups have reacted under trimerization. The unreacted isocyanate is then separated from the triisocyanurate by a vacuum distillation. The so obtained triisocyanatoisocyanurate is then mixed with isocyanaurate-free diisocyanate and blocked with $\epsilon$-caprolactam. The addition of isocyanurate-free diisocyanates allows one to vary in a desired fashion and by a very simple manner the properties of the products of this process.

It is particularly advantageous to treat the in situ prepared triisoyanatoisocyanurate mixture, which may contain among others other, oligomers of the diisocyanate, directly with $\epsilon$-caprolactam in a mixture with the monomeric diisocyanate.

The combination of triisocyanatoisocyanurate and diisocyanate is carried out in a weight ratio of between 80:20 to 30:70.

Even when the diisocyanate-containing isocyanurate group is not completely blocked with $\epsilon$-caprolactam, it is still possible to use it for the preparation of the powdery coating agents of the present invention; however, no more than one isocyanate group per molecule can be allowed to remain free since otherwise, cross-linking occurs upon the mixing of the components.

The hydroxy group containing compositions contain as essential ingredients the following:

1. cyclic polycarboxylic acids, such as phthalic acid, isophthalic acid, terephthalic acid, benzene-1,3,5-tricarboxylic acid, trimellitic acid anhydride, dimethylterephthalate (DMT);

2. Diols for example glycol, 1,2-propanediol, 1,3-butanediol, 1,4-butanediol, 2,2-dimethylpropanediol, hexanediol-1,6, 4,4'-dihydroxydicyclohexylpropane-2,2, cyclohexanediol, diethyleneglycol and bisethoxylated 4,4'-dihydroxydiphenyl-2,2-propane, 1,4-dihydroxymethylcyclohexane;

3. Polyols such as glycerine, hexanetriol, pentaerythrol, trimethylolpropane, trimethylolethane.

It is also possible that the polyesters contain monofunctional carboxylic acids such as for example benzoic acid as well as acyclic polycarboxylic acids such as adipic acid, 2,4,4-(2,2,4)-trimethyladipic acid, sebacic acid, dodecanedicarboxylic acid. The polyesters are prepared in a known fashion by esterification or transesterification, if necessary in the presence of catalysts, whereby by an appropriate choice of the COOH/OH-relation it is possible to obtain end products with hydroxy-count between 40 and 240, preferably between 40 and about 150.

The softening temperatures of the polyesters have to be low enough so that it is possible to work them up with the additives necessary for the coating compositions of the present invention, at temperatures between 70° and 120° C. The softening points on the other hand have to be high enough so that the coating agents of the present invention, obtained by said polyesters will not form lumps and that it will be possible to grind them to a free flowing powder with a particle size of about 20 to 120μ.

The coating agents of the present invention can be prepared into appropriate mixture aggregates, such as for example in a mixing chamber or a mixing screw. Customary additives such as pigments, flowing agents, softening agents, fillers and catalysts can be added in a very simple fashion without the use of solvents. The powdery coating agents of the present invention can be easily worked with in a usual fashion, that is for example in a vortex bed or through electrostatic spraying. Upon heating at temperatures higher than about 150° C., preferably between 160° and 200° C., it is possible to obtain coats with excellent properties.

The technical advantages of the powdery lacquers of the present invention based on hydroxy group-containing resins and ε-caprolactam-blocked isocyanurate structures containing polyisocyanates, are the following with respect to the state of the art:
1. A higher content of NCO-groups at equivalent or improved storage stability;
2. An increase in the cross-linking tightness of the hardened polyurethane and thereby a better adaptation to polyols with a low OH count;
3. A reduction of the hardening times;
4. A reduction in the minimally necessary hardening temperatures.

A further understanding can be obtained by reference to certain specific examples which are provided herein, for purposes of illustration only and are not intended to be limiting.

EXAMPLES

A. Preparation of the Polyester

A-1 6.75 mols (1323 g) of dimethylterephthalate, 2.25 mols (373.5 g) terephthalic acid, 6 mols (624 g) of 2,2-dimethylpropanediol-1,3,1 mol (134 g) trimethylolpropane and 3 mols (432 g) of 1,4-dimethylolcyclohexane were mixed in a 5 liter round bottom flask and heated by means of an oil bath. After these materials were mostly melted, 0.1% by weight of dibutyl-tin-oxide was added at a temperature of 160° C. as an esterification catalyst. Within 3 hours, the mixture temperature was slowly increased to 185° C. A further temperature increase to a maximum of 230° C. as mixture temperature, followed within a period of 8 hours, wherein the heating rate was dependent on the methanol-/water stripping. The polyester was then cooled to about 210° C. and freed from volatiles by evacuating to about 1 mm Hg. During the total condensation time, the reaction product was stirred intermittently. A nitrogen stream of about 30 l/h was used for the improved stripping of methanol and water.

Physical and Chemical data:

| | |
|---|---|
| OH-Titre | 48 mg KOH/g |
| Acid Titre | 3.5 mg KOH/g |
| Melting Point (Kofler) | 85–88° C. |
| Glass transition temperature/DTA | 52–62°C. |
| Viscosity at 160° C. | about 70,000 cSt. |

A-2 9 mols (1746 g) of dimethylterephthalate, 4 mols (416 g) of 2,2-dimethylpropanediol-1,3 3.75 mols (540 g) of 1,4-dimethylolcyclohexane and 2.5 mols (335 g) of trimethylolpropane were esterified under catalytic action by 0,05% by weight dibutyl tin oxide as in Example A-1. The first methanol separation took place at a mixture temperature of 170° C. The transesterification was finished after a period of about 14 hours whereby transesterification was carried out during the terminal phase at a maximum temperature of 220° C.

After vacuum treatment (see A-1) and cooling the following chemical and physical properties were obtained.

| | |
|---|---|
| OH-Titre | 100 mg KOH/g |
| Acid Titre | <1 mg KOH/g |
| Melting point (Kofler) | 35–91° C. |
| Glass transition temperature/DTA | 42–54° C. |
| Viscosity at 160° C. | about 19000 cSt. |

B. Preparation of the Triisocyanatoisocyanurate/isocyanate mixture

B-1 100 parts by weight of 3-isocyanatomethyl-3,5,5-trimethylcyclohexylisocyanate were mixed with 0.75 parts by weight of triethylamine, 0.5 parts by weight of ethyleneimine and heated to 60° C. After 3 hours, trimerization took place with heat evolution. By appropriate cooling, the temperature of the reaction medium was held at a maximum of 105° C. After 75 minutes, the temperature of the reaction medium was again 60° C. The NCO-content was 28.5%. This mixture of trimerized and monomeric IPDI was worked up by vacuum distillation. The oligomeric mixture now freed from excess monomeric IPDI showed a NCO-content of 18.0% and contained still only 1% monomeric IPDI.

B-2 100 parts by weight of 3-isocyanatomethyl-3,5,5-trimethycyclohexylisocyanate were mixed with 0.5 parts by weight of a catalytic system composed of 2 parts by weight of propylene oxide-1,2 and 1 part by weight of 1,4-diazabicyclooctane-(2,2,2) and heated for 3 hours at 120° C. During this time, the NCO-content fell from 37.8% (100% IPDI) to 28.4% (50% IPDI-turnover). For the deactivation of the catalyst, the reaction mixture was cooled to 40° C. and at this temperature was stripped for half an hour with nitrogen gas. The NCO-content was changed in the reaction mixture to 28.2%.

B-3 100 parts by weight of IPDI was mixed with 0.75 parts by weight of a cataryst system made of 2 parts by weight of propylene oxide and 1 parts by weight 1,4-diazabicyclooctane-(2,2,2) for two hours at 120° C. During this time the NCO-content fell from 37.8% to 29.4%. For the deactivation of the catalyst, the mixture was evacuated at 120° C. and 30 Torr for 15 minutes. During this time, the NCO-content of the reaction mixture fell further to 27%.

C. Blocked Isocyanate components

C-1 The solid trimerized 3-isocyanatomethyl-3,5,5-trimethylcyclohexylisocyanate according to B-1 was dissolved at a temperature of 110°–120° C. with stirring in monomeric IPDI in a 2 liter round bottom flask with ground glass joints. The solution was then cooled to 75° C. and molten $\epsilon$-caprolactam was added. Within a period of 10 minutes, the reaction temperature in the medium increased to about 150° C. due to the exothermic addition reaction. After the temperature fell to 110° C., the reaction mixture was further heated at 100°–110° C. for one hour in order to complete the reaction. The composition and the chemical and physical properties of the hardener (blocked polyisocyanate) C-1.1 and C-1.2 are summarized in Table 1.

TABLE 1

Composition, chemical and physical properties of various $\epsilon$-caprolactum-blocked isocyanate hardeners on the basis of IPDI and isocyanurate (C-1.1 and C-1.2)

| | Composition | | | Chemical and Physical Data | | | |
|---|---|---|---|---|---|---|---|
| | IDPI | Iso-Cyanurate | $\epsilon$-caprolactam | lat. NCO content | Free NCO content | melting point (Kofler) | Glass transition temperature |
| Hardener C-1.1 | 19.8% | 40.4% | 39.8% | 14.8% | 0.4% | 105–117° C. | 54–77° C. |
| Hardener C-1.2 | 37.2% | 16.8% | 46.0% | 17.1% | 0.6% | 66–75° C. | 34–54° C. |

C-2 To about 100 parts by weight of the isocyanatoisocyanaurate mixture prepared according to B-2 and B-3 were added at 100° C. 76.5 and 72.6 parts by weight of $\epsilon$-caprolactam in portions so that the reaction temperature was never higher than 120° C. In order to complete the reaction, the reaction mixture was still held for further two hours at 120° C.

The composition and chemical and physical properties of hardeners C-2.1 and C-2.2 are summarized in Table 2.

TABLE 2

Composition, chemical and physical properties of various $\epsilon$-caprolactum-blocked isocyanate hardeners on the basis of IPDI and isocyanurate (C-2.1 and C-2.2).

| | Composition | | | Chemical and Physical Properties | | | |
|---|---|---|---|---|---|---|---|
| | IDPI | Iso-cyanurate | $\epsilon$-caprolactam | lat. NCO content | Free NCO content | Melting Point (Kofler) | Glass Transition Temperature (DTA) |
| Hardener C-2.1 (acc. to B-3) | 24.8% | 33.7% | 41.5% | 15.4% | 0.5 | 85–92° C. | 46–60° C. |
| Hardener C-2.2 (acc. to B-2) | 29.7% | 27.0% | 43.3% | 16.0% | 0.7% | 78–83° C. | 44–55° C. |

C-3 Comparison 12 mols (2664 g) of monomeric IPDI and 6 mols diethyleneglycol (636 g) were mixed in an appropriate round bottom flask with stirring slowly and warmed to 70° C. At this temperature, the addition of the isocyanate on the diol took place with an increase in the heat evolution. The reaction flask was cooled during addition with an ice bath so that the temperature of the reaction mixture was never higher than 100° C. In order to run the reaction to completion, the reaction mixture was further heated for another 2 hours at 100° C. The NCO-content showed 15.1%.

The mixture was then cooled to 80° C. and an amount of $\epsilon$-caprolactam, stoichiometric with the content of isocyanate was added. Because of the exothermic reaction, the temperature rose then to 105° C. The highly viscous melt was further treated for 5 hours at 100° C. and then cooled to room temperature. The almost colorless solid had a softening temperature of 83° C. and an NCO-content of 0.3%.

EXAMPLE 1-Polyurethane-Powdery Lacquer

The preparation of the powdery lacquer followed according to techniques known in the art. It will thus only be described in a short fashion.

The composition had the following recipe:
52.5% Polyester A-1
12.4% Hardener C-2.1
34.6% Whitening pigment, TiO$_2$, Kronos RN 57 P
0.5% Lacquer-Compatible Polyacrylate, Acronal 4 F A master batch of the flowing agent was first prepared in the polyester. Master batch, polyester, hardener and pigment were intimately mixed in a solid mixture and then extruded at a mass temperature of 95°–100° C. The solidified melt was then ground to a particle size $<100\mu$ and the powder lacquer was applied electrostatically to a 1 millimeter steel test plate.

The lacquer was then heated under various different hardening conditions and after 24 hours was subjected to a technical testing of the lacquer.

In this type of systems, the elasticity, which can be measured technically by the Erichsen depression, is a good parameter for the determination of the degree of hardening.

TABLE 3

Test results on the powder laquer of Example 1

| Hardening Conditions | LS | HK | LC | KS | $GG_{20}$ | $GG_{45}$ | $GG_{60}$ | ET |
|---|---|---|---|---|---|---|---|---|
| 200° C., 20' | 50–70 | 183 | 0 | 80 | 68 | 61 | 97 | 10.4 |
| 15' | 50–60 | 183 | 0 | 80 | 68 | 61 | 98 | 10.8 |
| 12' | 50–60 | 187 | 0 | 80 | 67 | 60 | 97 | 11.2 |
| 10' | 50–60 | 185 | 0 | 80 | 65 | 60 | 96 | 9.4 |
| 180° C., 30' | 70–80 | 182 | 0 | 60 | 69 | 60 | 94 | 11.1 |
| 25' | 60–70 | 190 | 0 | 80 | 71 | 58 | 96 | 11.7 |
| 20' | 70–80 | 192 | 0 | 50 | 71 | 58 | 97 | 11.6 |
| 15' | 70–80 | 197 | 0 | 60 | 51 | 59 | 97 | 8.0 |
| 10' | 60–80 | 195 | 0 | 40 | 61 | 60 | 96 | 1.9 |
| 170° C., 30' | 60–70 | 187 | 0 | 50 | 60 | 61 | 97 | 8.7 |
| 20' | 60–70 | 188 | 0 | 40 | 60 | 61 | 95 | 5.1 |

EXAMPLE 2-Comparative Example

In this example, are described two polyurethane-powder lacquers.

The results point out clearly the differences between the lacquers according to the present invention and the coats on the basis of isocyanate urethane-adducts.

With the technique described in Example 1, powdery lacquers with the following recipes were prepared and applied to 1 millimeter steel plates.

Recipe I-Comparative:
    38.0% Polyester A-2
    27.5% Hardener C-3
    34.0% Whitening pigment, $TiO_2$, Kronos RN 57 P
    0.5% Lacquer compatible polyacrylate, Acronal 4 F Recipe II-Invention
    44.1% Polyester A-2
    22.0% Hardener C-2.1
    33.4% Whitening pigment, $TiO_2$, Kronos RN 57 P
    0.5% Lacquer-compatible polyacrylate, Acronal 4 F

TABLE 4

Results for the powdery lacquer of Example 2, Recipe I (comparative)

| Hardening Conditions | LS | HK | LC | Bl | $GG_{20}$ | $GG_{45}$ | $GG_{60}$ | ED |
|---|---|---|---|---|---|---|---|---|
| 200° C., 20' | 40–60 | 185 | 0 | 60 | 59 | 56 | 83 | 8.1 |
| 15' | 40–60 | 189 | 0 | 70 | 62 | 54 | 84 | 4.0 |
| 12' | 50–60 | 183 | 0 | 70 | 53 | 55 | 84 | 5.3 |
| 10' | 50–60 | 184 | 0 | 60 | 57 | 56 | 85 | 3.5 |
| 8' | 50–60 | 184 | 0 | 30 | 55 | 55 | 86 | 2.5 |
| 180° C., 30' | 60–70 | 189 | 0 | 70 | 66 | 59 | 84 | 4.1 |
| 25' | 60–70 | 197 | 0 | 50 | 64 | 55 | 92 | 3.0 |
| 20' | 60–80 | 188 | 0 | 40 | 53 | 55 | 91 | 1.7 |
| 15' | 50–70 | 194 | 0 | 40 | 67 | 52 | 89 | 1.8 |
| 10' | 50–70 | 194 | 0 | 20 | 58 | 55 | 91 | 0.5 |
| 170° C., 30' | 40–60 | 183 | 0 | 50 | 55 | 56 | 90 | 2.5 |
| 20' | 50–70 | 185 | 0 | 10 | 56 | 58 | 89 | 0.5 |

TABLE 5

Test results for the powdery lacquer of Example 2, Recipe II (invention)

| Hardening Conditions | LS | HK | LC | Bl | $GG_{20}$ | $GG_{45}$ | $GG_{60}$ | ED |
|---|---|---|---|---|---|---|---|---|
| 200° C., 20' | 50–60 | 194 | 0 | 80 | 70 | 57 | 95 | 10.1 |
| 15' | 50–70 | 196 | 0 | 50 | 76 | 57 | 97 | 7.5 |
| 12' | 50–70 | 198 | 0 | 50 | 59 | 58 | 97 | 6.8 |
| 10' | 50–60 | 195 | 0 | 70 | 72 | 59 | 95 | 9.7 |
| 8' | 50–60 | 190 | 0 | 70 | 70 | 58 | 94 | 10.1 |
| 190° C., 30' | 60–70 | 197 | 0 | 60 | 74 | 59 | 82 | 6.8 |
| 25' | 60–70 | 206 | 0 | 50 | 77 | 58 | 78 | 7.8 |
| 20' | 60–70 | 204 | 0 | 40 | 73 | 59 | 80 | 5.8–8.6 |
| 15' | 50–70 | 208 | 0 | 30 | 73 | 59 | 83 | 5.5 |
| 10' | 60–70 | 205 | 0 | 10 | 78 | 60 | 85 | 1.0 |
| 170° C., 30' | 60–70 | 200 | 0 | 30 | 75 | 59 | 85 | 5.0–10.0 |
| 20' | 60–80 | 205 | 0 | 20 | 75 | 58 | 88 | 3.0 |

EXAMPLE 3—Polyurethane—Powdery lacquer

With the technology described at Example 1, a polyurethane-powdery lacquer was prepared according to the following formulation, applied to 1 millimeter steel plates and hardened under various conditions.

Recipe:
    45.3% Polyester A-2
    20.2% Hardener C-1.2
    34.0% Whitening Pigment, $TiO_2$, Kronos RN 57 P
    0.5% Lacquer-Compatible Polyacrylate, Acronal 4 F

TABLE 6

Test results for the powdery lacquer of Example 3

| Hardening Conditions | LS | HK | LC | Bl | $GG_{20}$ | $GG_{45}$ | $GG_{60}$ | ED |
|---|---|---|---|---|---|---|---|---|
| 200° C., 15' | 50–60 | 190 | 0 | 80 | 75 | 62 | 99 | 9.7 |
| 12' | 50–60 | 190 | 0 | 80 | 76 | 61 | 98 | 10.0 |
| 10' | 50–60 | 186 | 0 | 50 | 75 | 61 | 99 | 7.0–9.4 |
| 8' | 50–60 | 189 | 0 | 60 | 75 | 61 | 99 | 5.0–6.0 |
| 180° C., 20' | 50–60 | 202 | 0 | 70 | 85 | 61 | 95 | 9.1 |
| 15' | 50–60 | 195 | 0 | 40 | 83 | 60 | 99 | 4.5 |
| 12' | 50–60 | 195 | 0 | 20 | 83 | 60 | 99 | 0.8 |
| 10' | 50–60 | 196 | 0 | 20 | 77 | 62 | 99 | 0.7 |
| 170° C., 30' | 50–60 | 195 | 0 | 80 | 79 | 59 | 98 | 70–9.7 |
| 20' | 50–60 | 196 | 0 | 70 | 78 | 58 | 97 | 7.0 |

EXAMPLE 4-Clear lacquer

100 Parts by weight of polyester A-2 were homogenized by means of an intensive stir at 120°–140° C. with 46.8 parts by weight of ε-caprolactam-blocked isocyananate-isocyanurate-mixture of IPDI, prepared according to C-2.2, and 0.73 parts by weight of silicon oil in the melt. After cooling, the homogeneous melt was broken and was then ground by means of a mill to a particle size of $<100\mu$. The thus obtained clear lacquer—powder was applied by means of an electrical powder spray at 60 kV to an iron plate primed with zinc phosphate and then burnt in at temperatures between 180 and 200° C. in a air drying oven.

TABLE 7

Test Results of the Clear Lacquer of Example 4

| Hardening Conditions | LS | HK | HB | ED | LC | Imp. rev. |
|---|---|---|---|---|---|---|
| 200° C., 15' | 30–50 | 204 | 125 | 10.2 | 0 | >82 |
| 190° C., 20' | 40–60 | 200 | 125 | 10.0 | 0 | >82 |
| 15' | 30–50 | 198 | 111 | 9.5 | 0 | >82 |
| 180° C., 20' | 40–60 | 195 | 125 | 9.8 | 0 | >82 |

EXAMPLE 5—Clear lacquer

The polyester A-2 was mixed with the hardener described in C-2.1 in an equivalent amount such as in Example 4.
Recipe:

100.00 Parts by weight of polyester A-2
48.00 Parts by weight of blocked isocyanate-isocyanurate according to C-2.1
0.74 Parts by weight of silicon oil OL The clear lacquer was, as described in Example 4, applied and then burnt in an air dry oven between 180° and 200° C.

TABLE 8

Tests Results with the Clear Lacquer of Example 5

| Hardening Conditions | LS | HK | HB | ED | LC | Imp. rev. |
|---|---|---|---|---|---|---|
| 200° C., 15' | 35–50 | 202 | 111 | 10.4 | 0 | >82 |
| 190° C., 20' | 35–60 | 200 | 125 | 10.2 | 0 | >82 |
| 15' | 30–50 | 199 | 125 | 9.9 | 0 | >82 |
| 180° C., 20' | 40–55 | 197 | 125 | 9.7 | 0 | >82 |

Explanation of the abbreviations used in Tables 3–8
LS = Layer Strength in $\mu m$
HK = Hardness according to König in sec (DIN 53 1157)
HB = Hardness according to Bucholz (DIN 53 153)
LC = Lattice Cut (DIN 53 151)
Bl-Ball impact in inch. lb
ED = Depression according to Erichsen in mm (DIN 53 156)
GG = Gloss according to Gardner (ASTM-D-523)
Imp. ref. = Impact reverse in inch. lb

Having now fully described this invention, it will be apparent to one of ordinary skill in the art that many and modifications can be made thereto, without departing from the spirit or scope of the invention set forth herein.

What is claimed as new and intended to be converted by letters Patent is:

1. A powdery polyurethane lacquer which comprises:
    (A) a hydroxy-group containing polyester resin with an OH number of 40–240 and;
    (B) an ε-caprolactam-blocked polyisocyanate which is a mixture of the triisocyanatoisocyanurate of 3-isocyanatomethyl-3,5,5-trimethyl-cyclohexylisocyanate with monomeric or oligomeric 3-isocyanatomethyl-3,5,5-trimethylcyclohexylisocyanate;
    wherein said ε-caprolactam-blocked triisocyanatoisocyanurate has at least two blocked isocyanate groups, and wherein said ε-caprolactam-polyisocyanate is present in an amount sufficient to cause hardening of said mixture of (A) and (B), at temperatures higher than about 150° C.

2. The lacquer of claim 1, wherein the amount of said ε-caprolactam-blocked polyisocyanate is 20–42% by weight.

3. The powdery lacquer of claim 1, wherein the weight ratio of isocyanaurate to monomeric diisocyanate is 80:20 to 30:70.

4. The lacquer of claim 1, wherein said hydroxy group-containing polyester resin is prepared from a cyclic polycarboxylic acid, its esters or anhydrides.

5. The lacquer of claim 4, wherein said polycarboxylic acid ester or anhydride is selected from the group consisting of phthalic acid, isophthalic acid, benzene-1,3,5-tricarboxylic acid, trimellitic acid anhydride, and dimethyl terephthalate.

6. The lacquer of claim 1, wherein said hydroxy group-containing polyester resin is prepared from a diol or a polyol.

7. The lacquer of claim 6, wherein said diol is selected from the group consisting of glycol, 1,2-propanediol, 1,3-butanediol, 1,4-butanediol, 2,2-dimethyl propanediol, hexanediol-1,6, 4,4'-dihydroxydicyclohexlpropane-2,2,-cyclohexanediol, diethylene glycol and bis-ethyloxated-4,4'-dihydroxydiphenyl-2,2-propane, and 1,4-dihydroxymethylcyclohexane.

8. The lacquer of claim 6, wherein said polyol is selected from the group consisting of glycerine, hexanetriol, pentearythrol, trimethylolpropane and trimethylolethane.

9. The powdery lacquer of claim 1, wherein said lacquer is in the form of a free flowing powder with a particle size of 20–120$\mu$.

10. The powdery lacquer of claim 1, wherein the OH number of said polyester is between 40–150.

* * * * *